(12) United States Patent
Fairfield et al.

(10) Patent No.: US 10,444,754 B2
(45) Date of Patent: Oct. 15, 2019

(54) REMOTE ASSISTANCE FOR AN AUTONOMOUS VEHICLE IN LOW CONFIDENCE SITUATIONS

(71) Applicant: Waymo LLC, Mountain View, CA (US)

(72) Inventors: Nathaniel Fairfield, Mountain View, CA (US); Joshua Seth Herbach, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 236 days.

(21) Appl. No.: 15/257,021

(22) Filed: Sep. 6, 2016

(65) Prior Publication Data

US 2016/0370801 A1 Dec. 22, 2016

Related U.S. Application Data

(63) Continuation of application No. 14/195,663, filed on Mar. 3, 2014, now Pat. No. 9,465,388.

(51) Int. Cl.
*G05D 1/00* (2006.01)
*H04L 29/08* (2006.01)
*B60W 50/02* (2012.01)

(52) U.S. Cl.
CPC .......... *G05D 1/0088* (2013.01); *G05D 1/0027* (2013.01); *G05D 1/0038* (2013.01);
(Continued)

(58) Field of Classification Search
CPC ... B60W 30/00; G05D 1/0027; G05D 1/0038; G05D 1/0044
(Continued)

(56) References Cited

U.S. PATENT DOCUMENTS 6,876,907 B2 4/2005 Alcatel
7,240,879 B1 7/2007 Cepollina
(Continued)

FOREIGN PATENT DOCUMENTS

EP 2400473 A1 12/2011
JP 09244745 9/1997
(Continued)

OTHER PUBLICATIONS

Ronald C. Arkin et al., "Overriding Etthical Constraints in Lethal Autonomous Systems," pp. 1-9, Jan. 2012, Mobile Robot Laboratory, Georgia Institute of Technology, Atlanta, GA, USA.
(Continued)

*Primary Examiner* — Maceeh Anwari
(74) *Attorney, Agent, or Firm* — McDonnell Boehnen Hulbert & Berghoff LLP

(57) ABSTRACT

Example systems and methods enable an autonomous vehicle to request assistance from a remote operator when the vehicle's confidence in operation is low. One example method includes operating an autonomous vehicle in a first autonomous mode. The method may also include identifying a situation where a level of confidence of an autonomous operation in the first autonomous mode is below a threshold level. The method may further include sending a request for assistance to a remote assistor, the request including sensor data representative of a portion of an environment of the autonomous vehicle. The method may additionally include receiving a response from the remote assistor, the response indicating a second autonomous mode of operation. The method may also include causing the autonomous vehicle to operate in the second autonomous mode of operation in accordance with the response from the remote assistor.

20 Claims, 11 Drawing Sheets

(52) U.S. Cl.
CPC ... *G05D 1/0044* (2013.01); *B60W 2050/0215* (2013.01); *G05D 2201/0213* (2013.01); *H04L 67/12* (2013.01)

(58) Field of Classification Search
USPC .......................................................... 701/2
See application file for complete search history.

(56) References Cited

U.S. PATENT DOCUMENTS

| | | | |
|---|---|---|---|
| 8,063,793 | B2 | 11/2011 | Shrum |
| 8,126,642 | B2 | 2/2012 | Anderson et al. |
| 8,131,432 | B2 | 3/2012 | Senneff |
| 8,340,902 | B1 | 12/2012 | Chiang |
| 8,467,928 | B2 | 6/2013 | Anderson |
| 8,473,140 | B2 | 6/2013 | Norris et al. |
| 8,521,352 | B1 | 8/2013 | Ferguson et al. |
| 8,527,199 | B1 | 9/2013 | Burnette et al. |
| 8,532,862 | B2 | 11/2013 | Stopp |
| 8,577,517 | B2 | 11/2013 | Phillips |
| 8,639,408 | B2 | 1/2014 | Anderson |
| 8,996,224 | B1 | 3/2015 | Herbach et al. |
| 2006/0089800 | A1 | 4/2006 | Svendsen et al. |
| 2007/0021915 | A1 | 1/2007 | Breed et al. |
| 2007/0233338 | A1 | 10/2007 | Ariyur et al. |
| 2008/0262721 | A1 | 10/2008 | Guo et al. |
| 2010/0061591 | A1 | 3/2010 | Okada et al. |
| 2010/0063663 | A1 | 3/2010 | Tolstedt et al. |
| 2010/0106356 | A1* | 4/2010 | Trepagnier ............ G01S 17/023 701/25 |
| 2011/0144828 | A1 | 6/2011 | Chengalva |
| 2011/0251768 | A1 | 10/2011 | Luo |
| 2011/0288695 | A1 | 11/2011 | Gariepy et al. |
| 2012/0095619 | A1 | 4/2012 | Pack et al. |
| 2012/0310465 | A1 | 12/2012 | Boatright et al. |
| 2013/0253765 | A1 | 9/2013 | Bolourchi et al. |
| 2015/0032366 | A1 | 1/2015 | Man et al. |
| 2015/0100567 | A1 | 4/2015 | Weir et al. |
| 2015/0294431 | A1 | 10/2015 | Fiorucci et al. |

FOREIGN PATENT DOCUMENTS

| | | |
|---|---|---|
| JP | 2000321081 | 11/2000 |
| WO | 2009140514 | 11/2009 |
| WO | 2011104369 | 9/2011 |
| WO | 2011154680 | 12/2011 |

OTHER PUBLICATIONS

International Searching Authority, International Search Report and Written Opinion for PCT/US2015/015039 dated May 19, 2015, 10 pages.

International Searching Authority, International Search Report and Written Opinion for PCT/US2015/015040 dated May 15, 2015, 14 pages.

\* cited by examiner

REMOTE ASSISTANCE FOR AN AUTONOMOUS VEHICLE IN LOW CONFIDENCE SITUATIONS

CROSS REFERENCE TO RELATED APPLICATION

The present application is a continuation of U.S. patent application Ser. No. 14/195,663 filed on Mar. 3, 2014, entitled "Remote Assistance for an Autonomous Vehicle in Low Confidence Situations," the contents of which are incorporated herein by reference, as if fully set forth in this description.

BACKGROUND

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

The present disclosure provides methods and apparatuses that enable an autonomous vehicle to request assistance from a remote operator when the vehicle's confidence in operation is low. During the operation of an autonomous vehicle, the vehicle may identify a situation where confidence in operation falls below a predetermined threshold. The vehicle may then send a request for assistance to a remote assistor, indicating the vehicle's current mode of operation as well as a sensor representation of its environment. The vehicle may receive a response back from the remote assistor indicating a second mode of operation. The vehicle may then switch to the second mode of operation.

In one example, a method is provided that includes operating an autonomous vehicle in a first autonomous mode. The method may also include identifying a situation where a level of confidence of an autonomous operation in the first autonomous mode is below a threshold level. The method may further include sending a request for assistance to a remote assistor, the request including sensor data representative of a portion of an environment of the autonomous vehicle. The method may additionally include receiving a response from the remote assistor, the response indicating a second autonomous mode of operation. The method may also include causing the autonomous vehicle to operate in the second autonomous mode of operation in accordance with the response from the remote assistor.

In another example, a method is provided that includes receiving a request for assistance from an autonomous vehicle. The request may include a sensor data representation of an environment of the autonomous vehicle, the sensor data representation including a representation based on sensor data collected by the vehicle and used by the vehicle to determine an autonomous mode of operation. The request may also include a video stream of a portion of the environment. The method may further include providing for display of a graphical interface showing the sensor data representation of the environment and the video stream of the portion of the environment. The method may also include receiving a proposed mode of autonomous operation for the autonomous vehicle via the graphical interface. The method may additionally include sending a response to the autonomous vehicle to switch to the proposed mode of autonomous operation.

In a further example, an autonomous vehicle including a control system is disclosed. The control system may be configured to operate the autonomous vehicle in a first autonomous mode. The control system may be also configured to identify a situation where a level of confidence of an autonomous operation in the first autonomous mode is below a threshold level. The control system may further be configured to send a request for assistance to a remote assistor, the request including sensor data representative of a portion of an environment of the autonomous vehicle. The control system may also be configured to receive a response from the remote assistor, the response indicating a second autonomous mode of operation. The control system may additionally be configured to cause the autonomous vehicle to operate in the second autonomous mode of operation in accordance with the response from the remote assistor.

In yet another example, a system may include means for operating an autonomous vehicle in a first autonomous mode. The system may also include means for identifying a situation where a level of confidence of an autonomous operation in the first autonomous mode is below a threshold level. The system may further include means for sending a request for assistance to a remote assistor, the request including sensor data representative of a portion of an environment of the autonomous vehicle. The system may also include means for receiving a response from the remote assistor, the response indicating a second autonomous mode of operation. The system may additionally include means for causing the autonomous vehicle to operate in the second autonomous mode of operation in accordance with the response from the remote assistor.

In an additional example, a system may include means for receiving a request for assistance from an autonomous vehicle. The request may include a sensor data representation of an environment of the autonomous vehicle, the sensor data representation including a representation based on sensor data collected by the vehicle and used by the vehicle to determine an autonomous mode of operation. The request may also include a video stream of a portion of the environment. The system may also include means for providing for display of a graphical interface showing the sensor data representation of the environment and the video stream of the portion of the environment. The system may further include means for receiving a proposed mode of autonomous operation for the autonomous vehicle via the graphical interface. The system may also include means for sending a response to the autonomous vehicle to switch to the proposed mode of autonomous operation.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
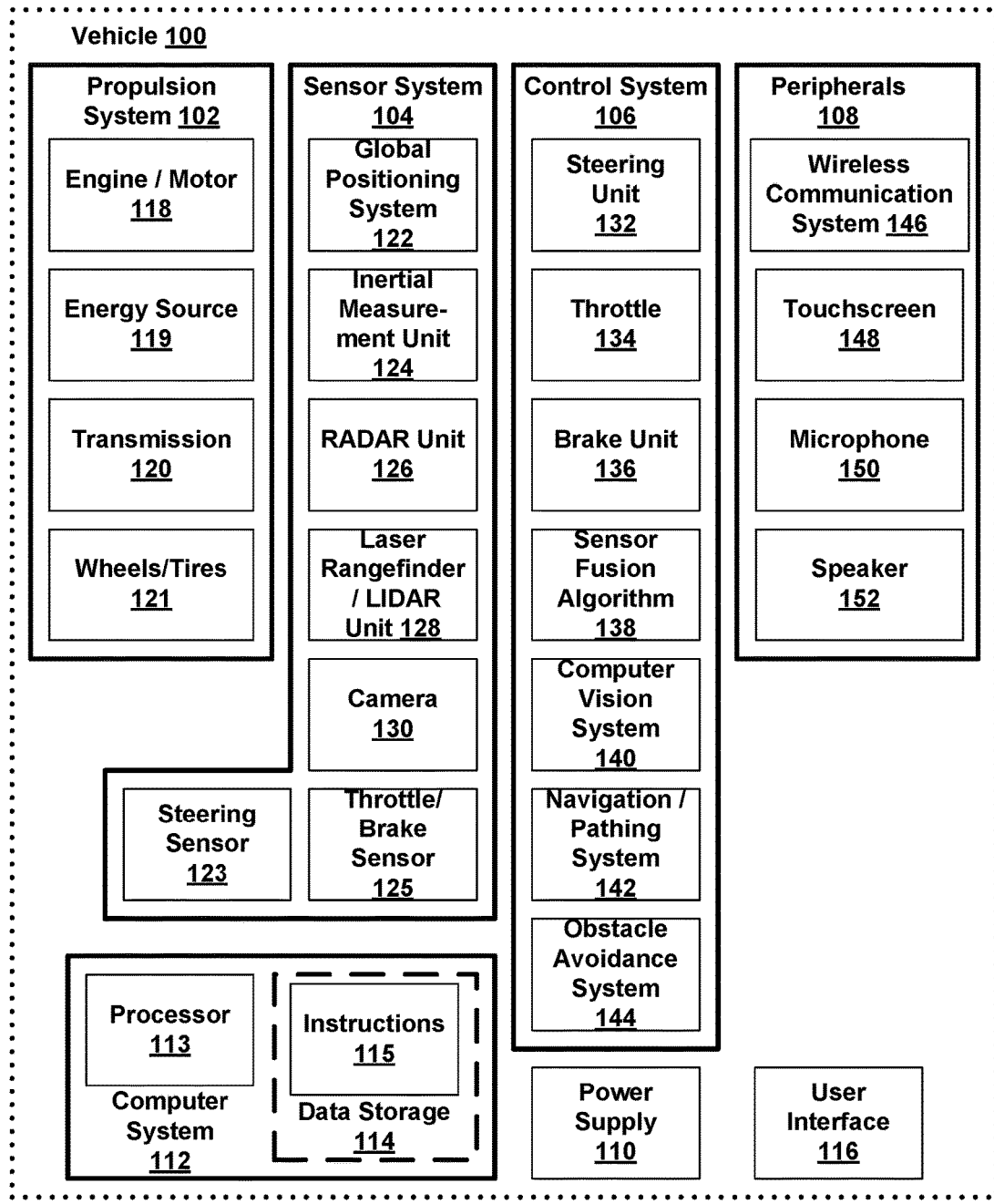
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

An autonomous vehicle may be configured to operate in an autonomous mode in which the vehicle may use a computer system to control the operation of the vehicle with little or no human input. For example, a human operator may enter an address into an autonomous vehicle and the vehicle may then be able to drive, without further input from the human (e.g., the human does not have to steer or touch the brake/gas pedals), to the specified destination.

The autonomous vehicle may maintain a confidence metric which indicates a level of confidence of different autonomous operations executed by the vehicle while operating in an autonomous mode. The vehicle may monitor the level of confidence and identify situations where the confidence level drops below a predetermined threshold. In those situations, the vehicle may seek assistance from a remote operator (e.g., a remote human operator or a more powerful computing system) in order to determine how to operate in low-confidence situations. The request for assistance may include sensor data (such as a video feed of a portion of the car's environment) in order to enable the remote assistor to provide guidance to the vehicle. In certain examples, the vehicle may additionally transmit one or more proposed modes of operation to the remote assistor.

In some examples, the vehicle may determine that it is not confident that its current mode of operation is correct, but may be uncertain of the cause. For instance, the car may be able to identify some type of blockage on the road, but may be unsure exactly what is causing the blockage or how to proceed. In such a circumstance, the car may send a request for assistance to a remote assistor, along with sensor data (e.g., a live camera feed) of its environment. The remote assistor may then provide a proposed alternative mode of operation for the vehicle to take. In some examples, the remote assistor may be a human operator presented with a graphical interface with which to view information about the car's environment and make a determination as to how the car should proceed. In other examples, the remote assistor may be a passenger within the autonomous vehicle. In further examples, the remote assistor may be a more powerful remote computer, which may be capable of resolving ambiguous situations that cannot be adequately processed by the vehicle's own computing systems.

In some examples, different factors (either individually or in combination) may indicate a low level of confidence, such that the vehicle should request remote assistance. These factors may include cues taken from the current environment of the car as well as cues taken from the vehicle's own actions. For instance, the vehicle may at some point become uncertain as to its current position within an environment (e.g., when it sees road markers or objects in unexpected locations), and may be unsure how or why it ended up in its current circumstance. In such a scenario, the vehicle may seek remote assistance to reorient itself.

In further examples, a request for assistance may be sent when the vehicle's view in certain directions is obstructed such that the vehicle cannot properly characterize its environment in order to determine how to proceed. As another example, when the vehicle is unsure how to classify a particular aspect of the environment (e.g., is an object that looks like a pedestrian really a pedestrian?), a request may be sent to the remote assistor for clarification.

In some examples, the remote assistor may suggest a particular behavior for the vehicle to take (e.g., an autonomous operation or sequence of operations). For instance, if the car is stuck for a certain period of time, it may send a request for assistance to the remote assistor, which may then indicate how the car should proceed (e.g., pass a road blockage using the left lane). In other examples, the remote assistor may provide guidance to the vehicle without specifying specific autonomous operations for the vehicle. For instance, the response from the guide may indicate a level of caution that the vehicle should use to determine autonomous operations. In another example, the remote assistor may identify nearby construction work and instruct the vehicle to operate at a slower speed. In further examples, the response from the guide may indicate future actions of the vehicle (e.g., to change lanes or pull over as soon as practical). More complex instructions from the remote assistor, possibly including several responses back and forth between the vehicle and the guide, are also possible.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

In some embodiments, the computer system 112 may make a determination about various objects based on data that is provided by systems other than the radio system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
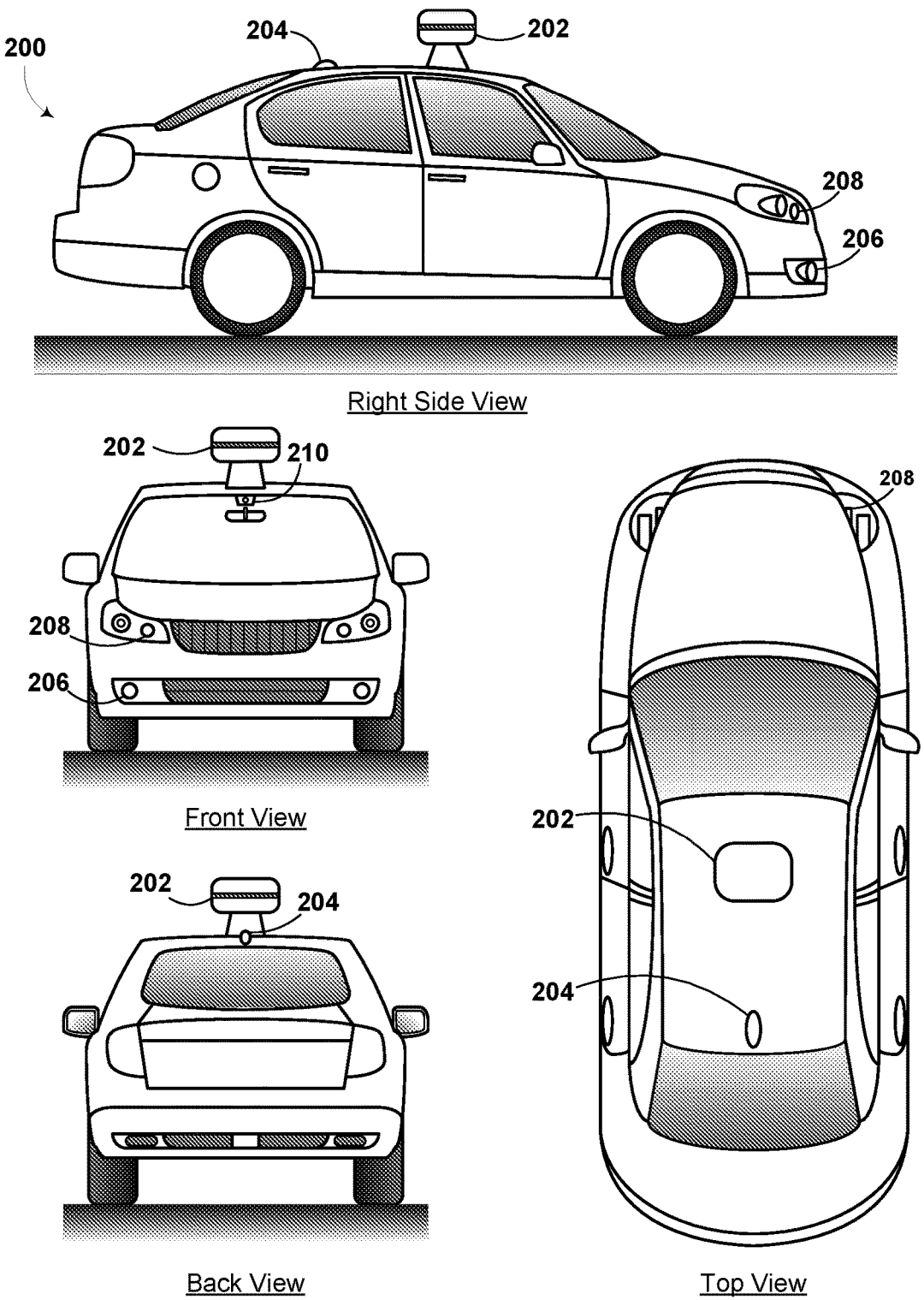
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radio unit 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, radio devices (e.g., Bluetooth and/or 802.11), and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radio unit 206 and laser range finder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

A method 300 is provided for enabling an autonomous vehicle to request assistance from a remote operator when the vehicle's confidence in its current mode of operation is below a predetermined threshold level. In some examples, method 300 may be carried out by a vehicle such as vehicle 100 and/or vehicle 200 as illustrated and described in reference to FIGS. 1 and 2, respectively. For example, the processes described herein may be carried out using a RADAR unit 126, a laser rangefinder and/or LIDAR unit 128, and/or a camera 130 mounted to an autonomous vehicle in communication with a control system 106, a sensor fusion algorithm 138, a computer vision system 140, a navigation system 142, and/or an obstacle avoidance system 144. Additionally, method 300 may be carried out using sensor data from one or more sensors on an autonomous vehicle (e.g., vehicle 200) such as sensor unit 202 and/or camera 210 as shown in FIG. 2.

Furthermore, it is noted that the functionality described in connection with the flowcharts described herein can be implemented as special-function and/or configured general-function hardware modules, portions of program code executed by a processor (e.g., the processor 113 within computer system 112) for achieving specific logical functions, determinations, and/or steps described in connection with the flowcharts shown in FIG. 3 or FIG. 5. Where used, program code can be stored on any type of computer-readable medium (e.g., computer-readable storage medium or non-transitory media, such as data storage 114 described above with respect to computer system 112 and/or a computer program product 600 described below), for example, such as a storage device including a disk or hard drive.

Figure 3:
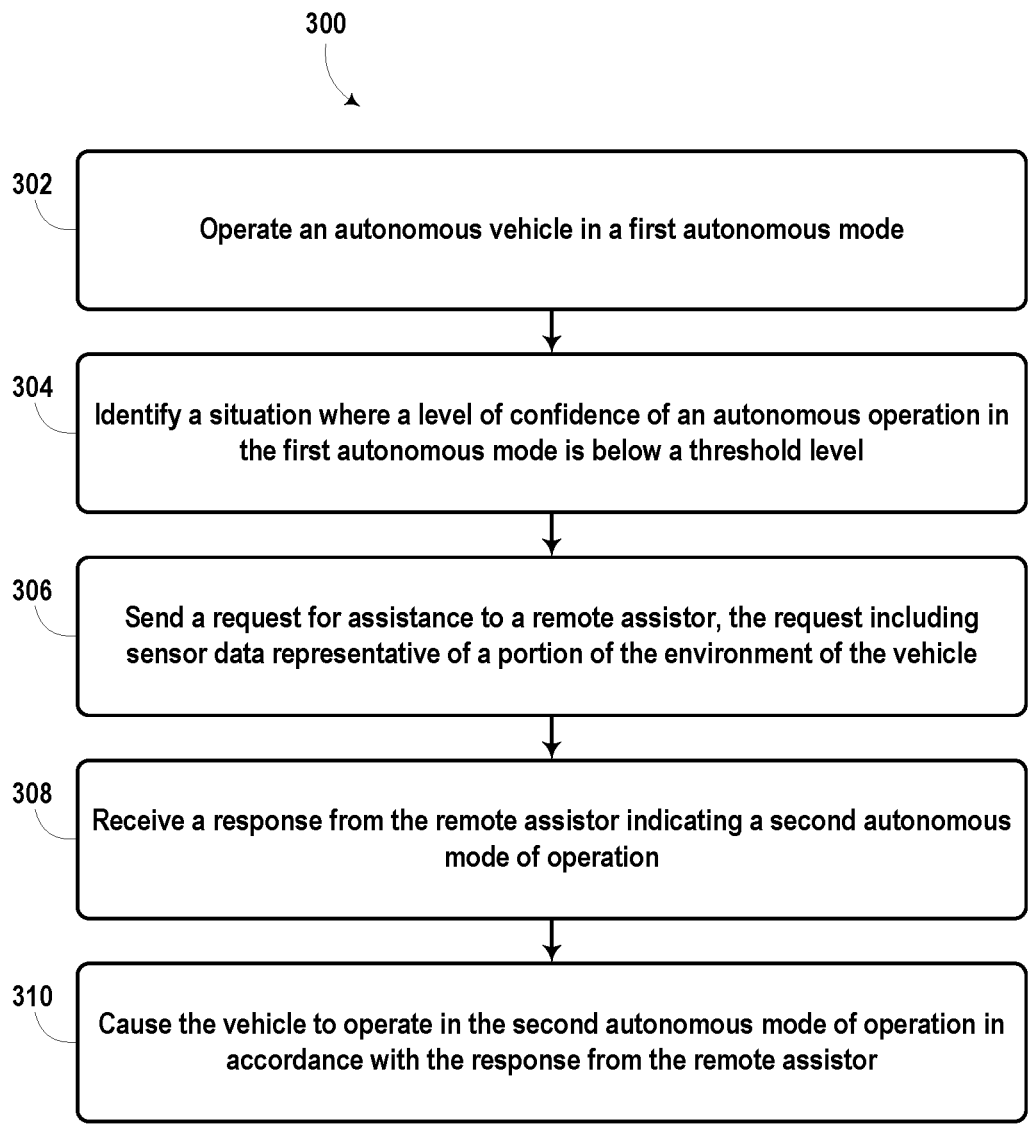
FIG. 3 is a block diagram of a method, according to an example embodiment.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 may initially involve operating an autonomous vehicle in a first autonomous mode. Within an autonomous mode, the vehicle may autonomously determine operations and perform the operations without input from a human operator (e.g., to control the vehicle to move to a particular drop-off location for passengers). Example autonomous operations may including turning, starting, stopping, passing an obstacle on the left or right, changing speed, changing trajectory, changing lanes, pulling over, backing up, or any number of other possible vehicle operations. In some examples, an autonomous mode may include a sequence of autonomous operations (e.g., to get from a first location to a second location).

In order to operate autonomously, the vehicle may continuously or periodically collect sensor data representative of its environment. An autonomous vehicle may receive data collected from environment in which the vehicle operates in a variety of ways. In particular the vehicle may be equipped with one or more sensor systems that provide data describing the surrounding environment. For example, a vehicle may have various sensors, including a camera, a radar unit, a laser range finder, a microphone, a radio unit, and other sensors. Each of these sensors may communicate data to a processor in the vehicle about information each respective sensor receives.

In one example, a camera may be configured to capture still images and/or video. In various embodiments, the vehicle may have more than one camera positioned in different orientations. Also, in some embodiments the camera may be able to move to capture images and/or video in different directions. The camera may be configured to store captured images and video to a memory for later processing by a processing system of the vehicle. The captured images and/or video may form a portion of the sensor data collected from the environment.

In another example, a radar unit may be configured to transmit an electromagnetic signal that will be reflected by various objects near the vehicle. The radar unit may be able to capture reflected electromagnetic signals. The captured reflected electromagnetic signals may enable the radar system (or processing system) to make various determinations about objects that reflected the electromagnetic signal. For example, the distance and position to various reflecting objects may be determined. In various embodiments, the vehicle may have more than one radar unit in different orientations. The radar system may be configured to store captured information to a memory for later processing by a processing system of the vehicle. The information captured by the radar system may form a portion of the sensor data collected from an environment.

In further examples, a laser range-finding system may be configured to transmit an electromagnetic signal (e.g., light, such as that from a gas or diode laser, or other possible light source) that will be reflected by target objects near the vehicle. The laser range-finding system may be able to capture the reflected electromagnetic (e.g., laser) signals. The captured reflected electromagnetic signals may enable the range-finding system (or processing system) to determine a range to various objects. The range-finding system may also be able to determine a velocity or speed of target objects and store it as data collected from an environment.

Additionally, in other examples, a microphone may be configured to capture audio data from the environment surrounding the vehicle. Sounds captured by the microphone may include sounds from vehicles or other aspects of the environment. For example, the microphone may capture the sound of the siren of an emergency vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the sensor data collected from the environment.

In additional examples, the radio unit may be configured to transmit an electromagnetic signal that may take the form of a Bluetooth signal, 802.11 signal, and/or other radio technology signal. The electromagnetic radiation signal may be transmitted via one or more antennas located in a radio unit. Further, the electromagnetic radiation signal may be transmitted with one of many different radio-signaling modes. In some embodiments, it may be desirable to transmit the electromagnetic radiation signal with a signaling mode that requests a response from devices located near the autonomous vehicle. The processing system may be able to detect nearby devices based on the responses communicated back to the radio unit and use this communicated information as a portion of the sensor data collected from the environment.

In some embodiments, the processing system may be able to combine information from some or all of the vehicle's sensors in order to make further determinations about the environment of the vehicle. For example, the processing system may combine both radar information and a captured image to determine if another vehicle or pedestrian is in front of the autonomous vehicle. In other embodiments, other combinations of sensor data may be used by the processing system to make determinations about the environment as well.

While the vehicle is operating autonomously, the processing system of the vehicle may alter the control of the vehicle based on data received from the various sensors. In some examples, the autonomous vehicle may alter a velocity of the autonomous vehicle in response to data from the various sensors. For instance, the autonomous vehicle may change velocity in order to avoid obstacles, obey traffic laws, etc. When a processing system in the vehicle identifies obstacles or other situations encountered by the autonomous vehicle, the vehicle may be able to autonomously determine how to proceed (e.g., by altering velocity, changing trajectory to avoid an obstacle, and so on).

Block 304 of method 300 includes identifying a situation where a level of confidence of an autonomous operation is below a predetermined threshold. The vehicle may maintain a confidence level indicating how confident it is that its current mode of operation is correct. The confidence level may be determined based on any combination of the types of sensor data described above as well as previously stored information about the environment. In some examples, one or more sensor systems within the vehicle may be configured to trigger a warning signal which may decrease the confidence level of the vehicle. In other examples, conflicting signals from different systems within the vehicle may also decrease the confidence level.

In further examples, the confidence level may drop below the threshold level based on one or more features detected within the environment. For instance, the vehicle may detect one or more obstacles within the environment that it cannot identify with confidence. For example, the vehicle may detect an object that appears to be a pedestrian located near the vehicle, and the vehicle may not be confident how to proceed without knowing with confidence whether a pedestrian is present in the environment or not. In such a scenario, the vehicle may request assistance in order to determine whether a pedestrian is present and/or to get instructions how to proceed with operation.

In other examples, the confidence level may drop below the threshold level based on uncertainty about the vehicle's position within the environment. For instance, the vehicle may detect one or more features within the environment (objects, signs, road markers, etc.) that are not located where the vehicle expects based on prior maps of the environment. In these scenarios, the vehicle may seek remote assistance in order to orient itself within the environment.

In additional examples, the vehicle's view of a portion of the environment may be obscured and/or sensor data collected about the environment may be distorted such that the vehicle cannot determine what operation to execute with confidence. For example, the vehicle may come to an intersection where bushes or trees obscure the vehicle's view in certain directions. In such a scenario, the vehicle may seek assistance from a remote operator to proceed through the intersection. In some examples, the remote operator may be able to better interpret an obstructed view and determine a proper course of action for the vehicle.

In other examples, the vehicle's confidence level may drop below the threshold level based on aspects of its own operation. For example, the vehicle may be physically stuck for a certain period of time (e.g., behind an obstacle), and may not be confident that continuing to wait is the correct course of action. In such a scenario, the vehicle may seek assistance in order to determine whether a remote assistor proposes another course of action besides waiting for the path to clear.

In yet further examples, the vehicle's confidence level may drop based on any combination of the factors described above and/or other types of factors. For instance, the confidence level may be a probability (e.g., 0 to 1) that is continually or periodically updated as the vehicle operates within an environment and new sensor data is received. Within examples, certain factors may affect the confidence level more than others. For instance, factors associated with more important operations (e.g., ones affective vehicle safety) may have a greater effect on the confidence level (and therefore more likely to trigger requests for assistance).

Figure 4A:
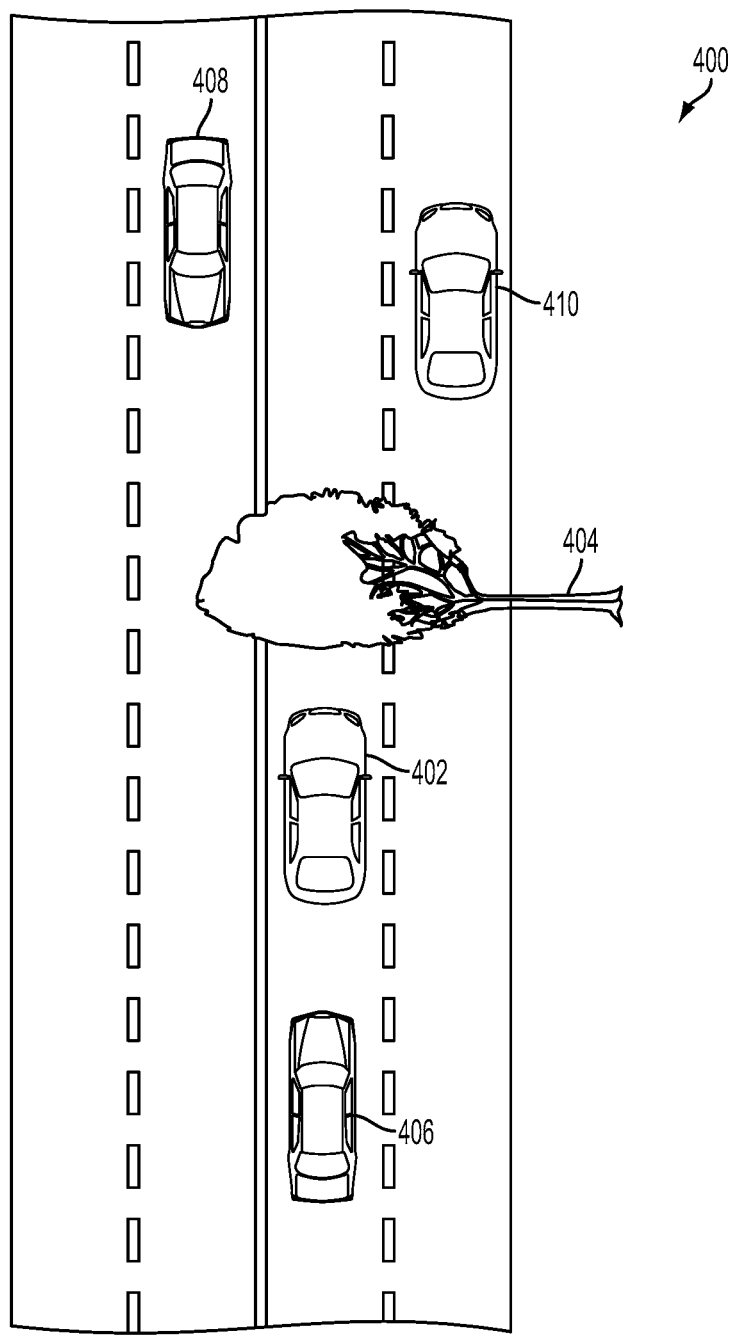
FIG. 4A illustrates a top view of an autonomous vehicle operating scenario, according to an example embodiment.

FIG. 4A illustrates a top view of a scenario encountered by an autonomous vehicle, in accordance with an example embodiment. As shown, an autonomous vehicle 402 may be operating within an environment 400 containing other vehicles 406, 408, and 410. The autonomous vehicle 402 may be operating in an autonomous mode with a lane of travel when it approaches an obstacle in the road, in this example a fallen tree 404.

Figure 4B:
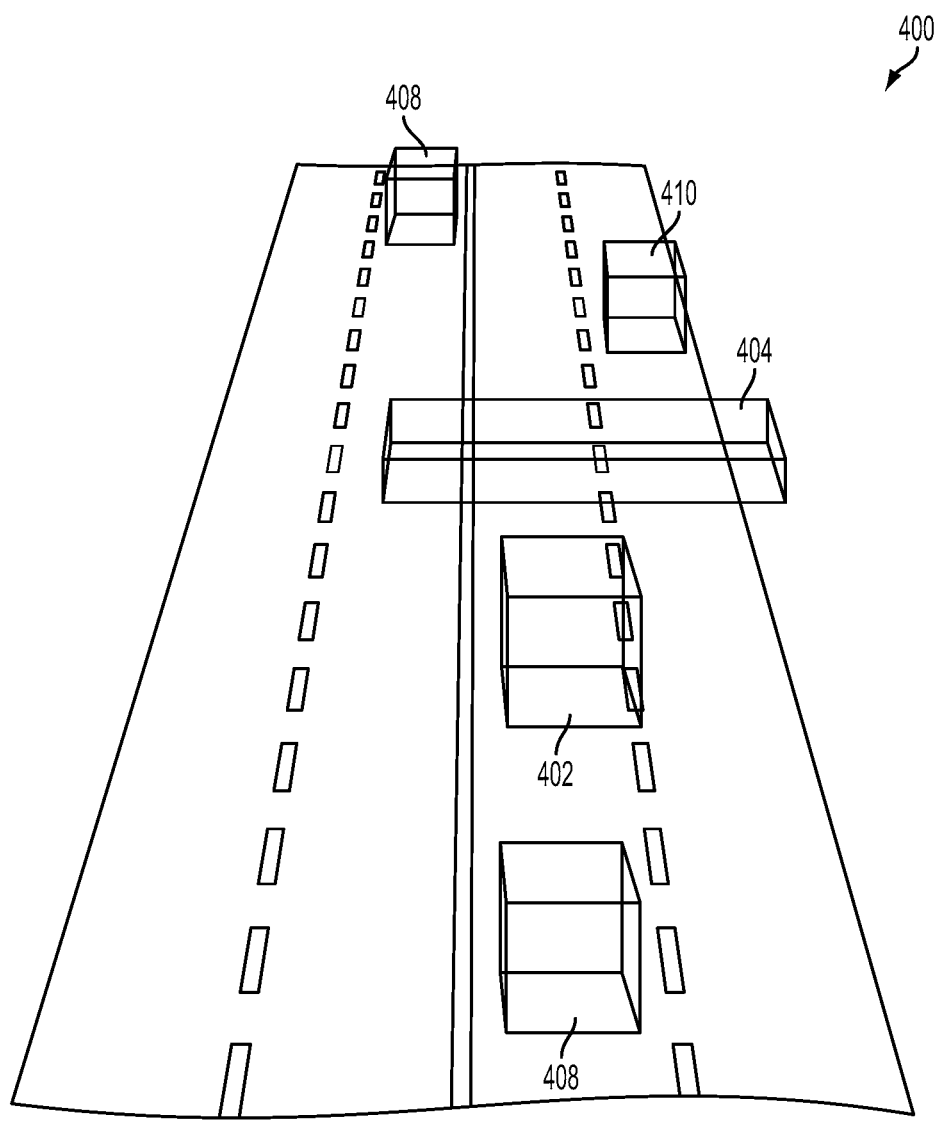
FIG. 4B illustrates a sensor data representation of the scenario from FIG. 4A, according to an example embodiment.

The autonomous vehicle 402 may create a representation of its environment 400 based on any combination of possible types of sensor data as described above. FIG. 4B illustrates a representation of the environment from FIG. 4A based on sensor data collected by the vehicle, according to an example embodiment. In some examples, the representation may not be a perfect copy of the environment. For instance, some of the sensors may be blocked in certain directions or some of the sensor data may be distorted. Additionally, some objects may be abstracted into geometric shapes, such as the representations of the vehicles 406, 408, and 410 or the fallen tree 404 shown in the figure. The autonomous vehicle 402 may identify objects or other aspects of the environment with varying levels of precision.

The situation depicted in FIG. 4A and FIG. 4B may be a situation in which the vehicle's confidence level drops below a predetermined threshold level. The drop in confidence may be based on one or more different factors about the vehicle's operation and/or the vehicle's view of the environment. For example, the vehicle 402 may not be able to create a complete sensor representation of its environment because the fallen tree 404 may be obstructing its views of aspects of the environment (e.g., other cars). Additionally, the vehicle 402 may not be able to identify with confidence one or more objects within the environment, possibly including the fallen tree 404. Also, aspects of the vehicle's own operation may also cause its confidence level to drop. For instance, the vehicle may have stopped behind the fallen tree 404, and may have remained stuck there for a certain period of time, which may trigger a warning from one of the vehicle's systems. In some examples, if the vehicle 402 is stuck for more than a predetermined set amount of time (e.g., 1 minute or 5 minutes), its confidence level may begin to drop. Other factors may contribute to the vehicle's determination that its confidence in how to proceed (e.g., whether to continue waiting or to do something else) has fallen to a level where the vehicle should request remote assistance.

Block 306 of method 300 includes sending a request for assistance to a remote assistor. The request may include the vehicle's current representation of its environment (e.g., such as depicted in FIG. 4B), as discussed above with respect to block 304. In some examples, the request may additionally include at least a subset of the sensor data collected by the vehicle from its surrounding environment. For example, a live video stream from one or more video cameras and/or still photos may be transmitted along with the request for assistance.

Figure 4C:
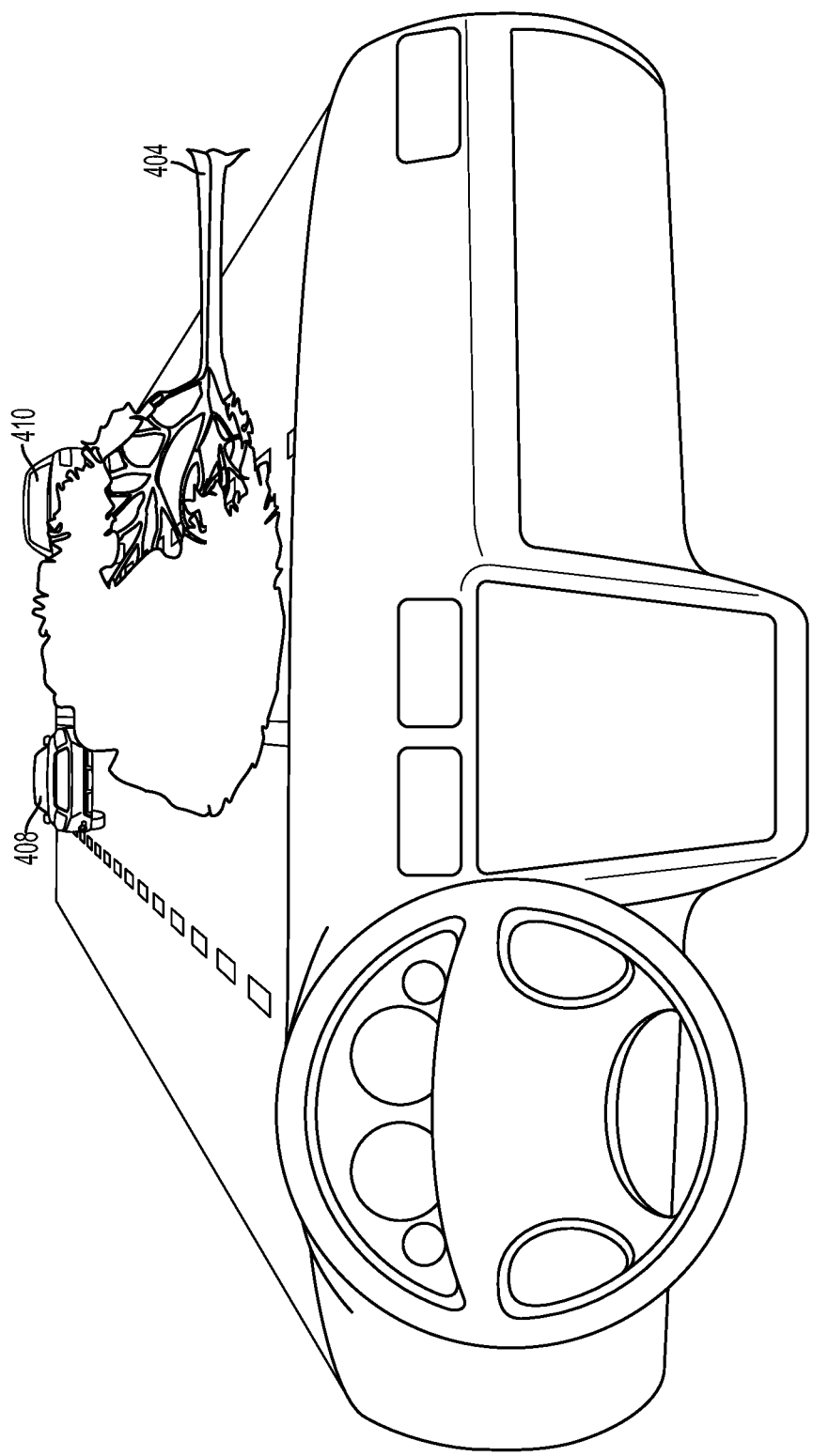
FIG. 4C illustrates a video feed taken from the vehicle in FIG. 4A, according to an example embodiment.

FIG. 4C shows a video stream of the environment 400 of autonomous vehicle 402 from the point-of-view of the autonomous vehicle 402. For example, the autonomous vehicle 402 may be equipped with one or more video cameras which capture video streams of a portion of the environment 400. This data may be transmitted along with the request with assistance for use by the remote operator. In this example, the portion of the environment 400 captured in the video stream includes the fallen tree 404 as well as parts of cars 408 and 410 that are not obstructed by the fallen tree 404. In some examples, the cameras may be moveable (and possibly may be controlled directly or indirectly by a remote operator) in order to capture video of additional portions of the environment 400 in order to resolve certain scenarios.

In further examples, the request for assistance may additionally include one or more suggested autonomous operations for the vehicle to take in the identified situation. For example, referring back to the scenario described with respect to FIG. 4, the vehicle may transmit options that may include holding position or attempting to pass the obstacle on the left. In one example, the vehicle may send a single suggested operation in order to receive verification of its proposed course of action, and may hold position until a response is received. In other examples, the vehicle may send a set of two or more proposed options for the remote assistor to select from. In some cases, the vehicle may not be able to propose a course of action. In such examples, the human guide may be able to propose a course of action for the vehicle to take, or a set of two or more possible courses of action.

In additional examples, the request for assistance may involve multiple parts. For example, the vehicle may ask a series of questions of the remote assistor in order to determine how to proceed with operation. For example, referring to the situation depicted in FIG. 4A, the vehicle 402 may first request assistance in order to identify the obstacle in the road as a fallen tree 404. The vehicle 402 may then make a second request in order to determine how best to proceed given that the obstacle has been identified as a fallen tree 404. Other more complicated discourses between the vehicle 402 and remote operator are possible as well.

Figure 4D:
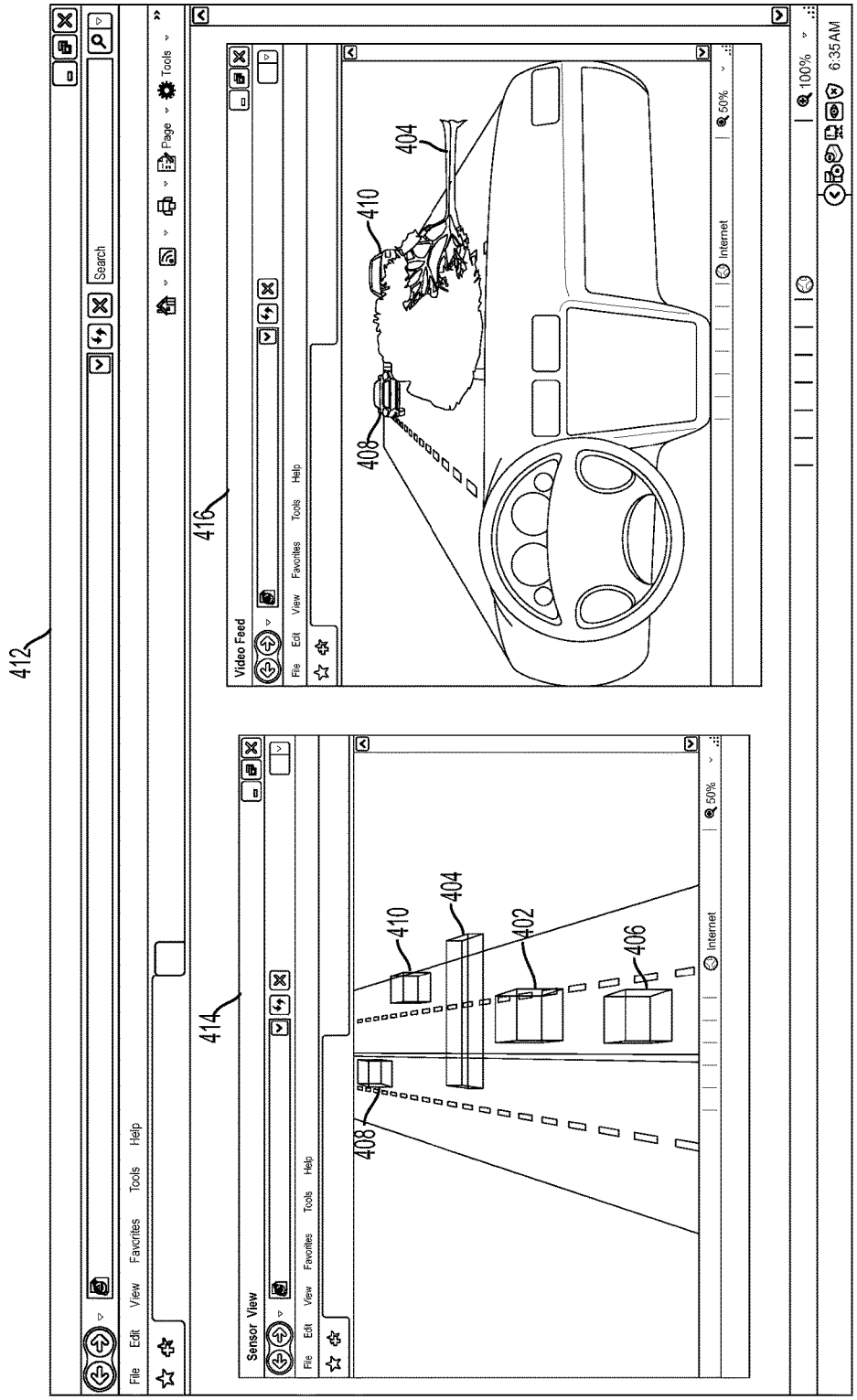
FIG. 4D illustrates a graphical interface containing the sensor data representation from FIG. 4B and the video feed from FIG. 4C, according to an example embodiment.

In some examples, the human operator may be located in a remote location that has a wireless connection with a communication system of the vehicle. For example, a remote human operator may be located at a remote computer terminal with a graphical interface that provides information from the autonomous vehicle in order for the human operator to answer the request. For instance, FIG. 4D shows one example graphical interface that may be presented to a human operator. The graphical interface 412 may include separate sub-windows 414 and 416. The first sub-window 414 may include the vehicle's sensor data representation of its environment, such as described above with respect to FIG. 4B. The second sub-window 416 may include a video stream of a portion of the environment, such as described above with respect to FIG. 4C. Accordingly, the human operator may be able to compare the vehicle's understanding of its environment with the video stream to verify the vehicle's representation of its environment and/or to verify or suggest a planned course of action of the vehicle.

In other example embodiments, the request for assistance may be sent to a human assistor located within the autonomous vehicle, such as a passenger in the passenger seat or a person sitting in the driver's seat. In certain situations, the passenger may have the best views in order to determine how to resolve a given situation. In some examples, a request may be sent simultaneously to a remote assistor as well as a passenger of the vehicle.

In additional embodiments, the request may be sent to a more powerful computer than exists within the autonomous vehicle, such as a remote computer server. The more powerful computer may have more computational power than the computing system in the autonomous vehicle and/or more stored data about the environment, and therefore may able to more accurately determine how to proceed within a given scenario. In some embodiments, the autonomous vehicle may wirelessly communicate a subset of the sensor data collected about the environment to the remote computing device as well.

In further embodiments, the more powerful computer may also not be able to determine a proper course of action to the identified scenario. When this happens, the system may fall back to a human operator to try to resolve the scenario in some example systems. Additionally, in some embodiments, the more powerful computer and the human operator may both receive a request for assistance. Therefore, either the more powerful computer or the human operator (and possibly both) may be able to determine a proper course of action for the vehicle. By transmitting data to both the more powerful computer and the human operator at approximately the same time, there may be some redundancy benefit in case one or the other fails to respond fast enough. The request for assistance may additionally contain a timeout amount indicating an amount of time in which a response to the request is needed.

Block 308 of method 300 includes receiving a response from the remote assistor indicating a second autonomous mode of operation. In some examples, the second autonomous mode may indicate one or more different autonomous operations for the vehicle to execute. In one example, the vehicle may have sent a single proposed operation to the remote assistor. In that case, the response may indicate that the vehicle is free to proceed with the proposed operation, and the vehicle may hold position until receiving the response. In other examples, the vehicle may have sent two or more proposed operations to the remote assistor, in which case the response may indicate which of the proposed operations the vehicle should take. The remote assistor may be able to propose different autonomous operations for the vehicle to take as well or instead.

In other examples, the second mode of operation may provide guidance to the vehicle on how to proceed without specifying particular operations. For instance, the mode of operation may indicate a level of caution for the vehicle to use in determining autonomous operations. A level of caution may indicate how certain the vehicle must be in an autonomous operation before executing the operation. As an example, the vehicle may have identified a low-confidence situation in which the vehicle may have entered an area with ongoing construction, prompting a request for assistance. A response from the remote indicator may indicate that the vehicle should proceed through the area with a higher level of caution in determining operations. Operating with a higher level of caution may mean that the vehicle does not attempt to pass a vehicle when it would require moving to a narrow lane, slowing down further in advance when detecting an obstacle, or refusing to go above a certain speed while in the construction area, for example.

In another example, the response may indicate a particular range of speeds with which the autonomous vehicle may operate. For instance, the response may in some cases indicate that there is nothing in the environment to be concerned about and the vehicle should proceed with full normal operating speed. In other situations, the response may identify some potential concerns and therefore the vehicle should proceed slower than usual, perhaps for a set amount of time or distance. In other examples, a mode of operation may indicate other aspects of how the vehicle should operate, such as which lane the vehicle should try to stay in on a multi-lane road.

In further examples, the response may provide guidance with which the autonomous vehicle may be able to derive its own operations. For example, the response may simply help the vehicle identify a particular object or other aspect of the environment (e.g., identifying another car, a pedestrian, or a sign). With this information, the vehicle may then be able to determine proper autonomous operations to proceed without further assistance from the guide. Alternatively, the vehicle may send one or more additional requests for assistance if needed.

As another example, the response may provide a particular focus region for the vehicle. For instance, a focus region may indicate to the vehicle where a stop light is that the vehicle needs to watch in order to determine when to proceed (or which stop light to watch if there are multiple stop lights at an intersection). As another example, the focus region may indicate where potential obstacles or hazards may be likely to occur. For instance, the response may indicate a region within the environment that the car should watch and not move until the region is clear of any obstacles. As another example, the focus region may indicate which policeman directing traffic the vehicle should watch for instruction at an intersection with multiple policemen simultaneously directing traffic. Other examples of directing vehicle focus are also possible.

Figure 4E:
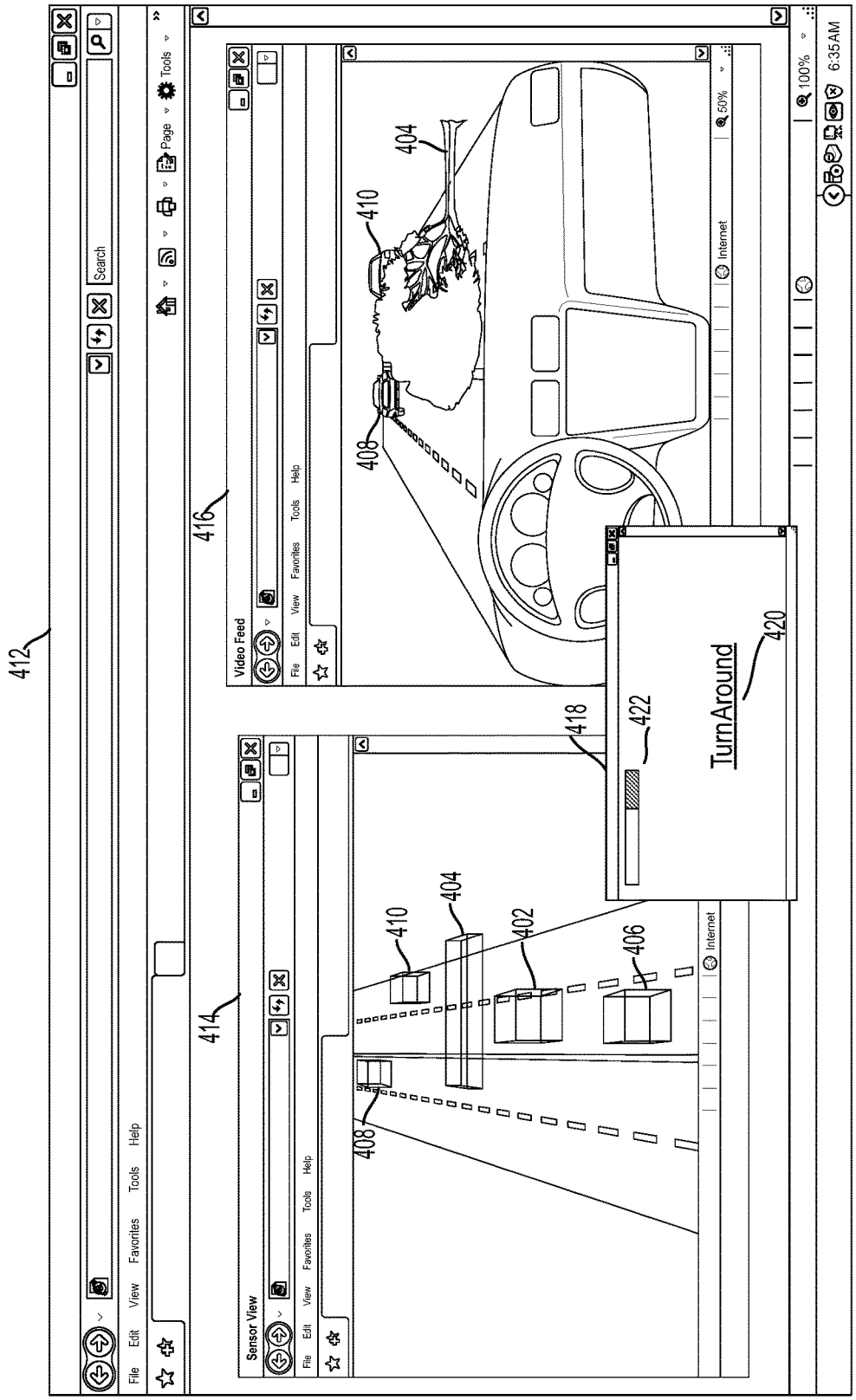
FIG. 4E illustrates the graphical interface from FIG. 4D including a control menu, according to an example embodiment.

The remote assistor may be presented with a graphical interface that contains a control menu that enables a remote assistor to send a response to a vehicle indicating a proposed autonomous mode of operation. For example, FIG. 4E shows an example graphical interface that contains a first sub-window showing the vehicle's sensor data representation of its environment and a second sub-window showing a video stream of a portion of the vehicle's environment, such as described above with respect to FIG. 4D. FIG. 4E additionally contains a control menu 418 that may allow a human operator to enter a mode of operation for the vehicle. Depending on the type of response provided to the vehicle, the control menu 418 may allow the operator to input guidance to the vehicle in a number of different ways (e.g., selecting from a list of operations, typing in a particular mode of operation, selecting a particular region of focus within an image of the environment, etc.).

In the example depicted in FIG. 4E, the human guide may indicate that the vehicle should Turn Around 420 in order to signal that the autonomous vehicle 402 should not continue to wait behind the fallen tree 404. Additionally, the proposed mode may indicate how the vehicle 402 should proceed in order to continue operation (e.g., to turn around and go back the other way rather than attempting to pass the obstacle). The control menu 418 may additionally contain a latency bar 422 indicating how old the received sensor data is, which may affect the human guide's response.

The response to the request for assistance may be received in a number of different ways. In cases where the request for assistance was sent to a remote assistor (or a remote computing system) not located within the vehicle, the response may be received wirelessly through a communication system located within the autonomous vehicle. In other embodiments, such as those where the request for assistance was sent to a passenger located with the vehicle, the response may be received when the passenger enters an autonomous operation into a graphical interface of a computer system located within the vehicle. A passenger may be able to instruct the vehicle in other ways as well, such as through voice commands or through a handheld mobile device. Other modes of transmitting and/or receiving the request for assistance and/or the response to the request may also be used.

Block 310 of method 300 includes causing the vehicle to operate in the second autonomous mode in accordance with the instructions from the guide. When the vehicle receives the response to the request for assistance, the response may indicate that the vehicle should execute one or more particular autonomous operations. Based on the response, the vehicle may proceed with the autonomous operations, which may be to turn, start, stop, pass on the left or right, change speed and/or direction, pull over, back up, or any number of other possible operations.

In other examples, the vehicle may do additional processing before proceeding with the autonomous mode of operation. For instance, the vehicle may have received certain information (e.g., identification of an object) from which the vehicle may then determine what operations it should perform. In other examples, the second mode of operation may indicate a permanent or extended change in autonomous behavior. For example, the vehicle may operate with a different level of caution, within a different range of speeds, or within a different lane of travel based on the response from the remote assistor. In other examples, the vehicle may verify the received response before changing modes. For example, if the latency associated with the received instruction is too high to be trusted, the vehicle may send another request for assistance before proceeding.

Figure 4F:
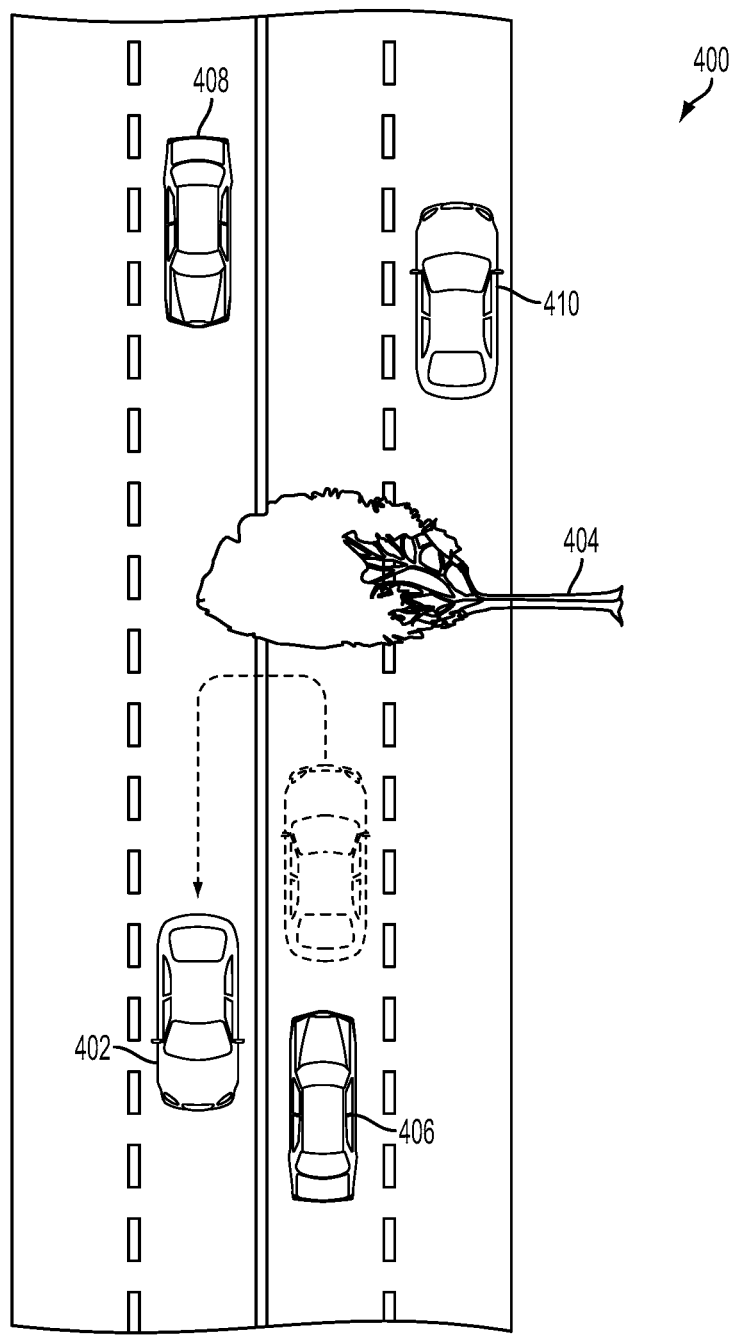
FIG. 4F illustrates a top view of the autonomous vehicle from FIG. 4A after switching to a different mode of autonomous operation, according to an example embodiment.

FIG. 4F shows the autonomous vehicle 402 turning around in accordance with the instructions from the remote assistor. For example, a remote operator may have viewed a video stream of the environment and determined that the safest or only feasible course of action for the vehicle 402 to operate with is to turn around and find a different way to its destination. Accordingly, after turning around, the vehicle may then resume operating autonomously without further assistance from the remote assistor. In other examples, the remote assistor may indicate further instructions to the vehicle (e.g., a proposed route around the blocked road).

Figure 5:
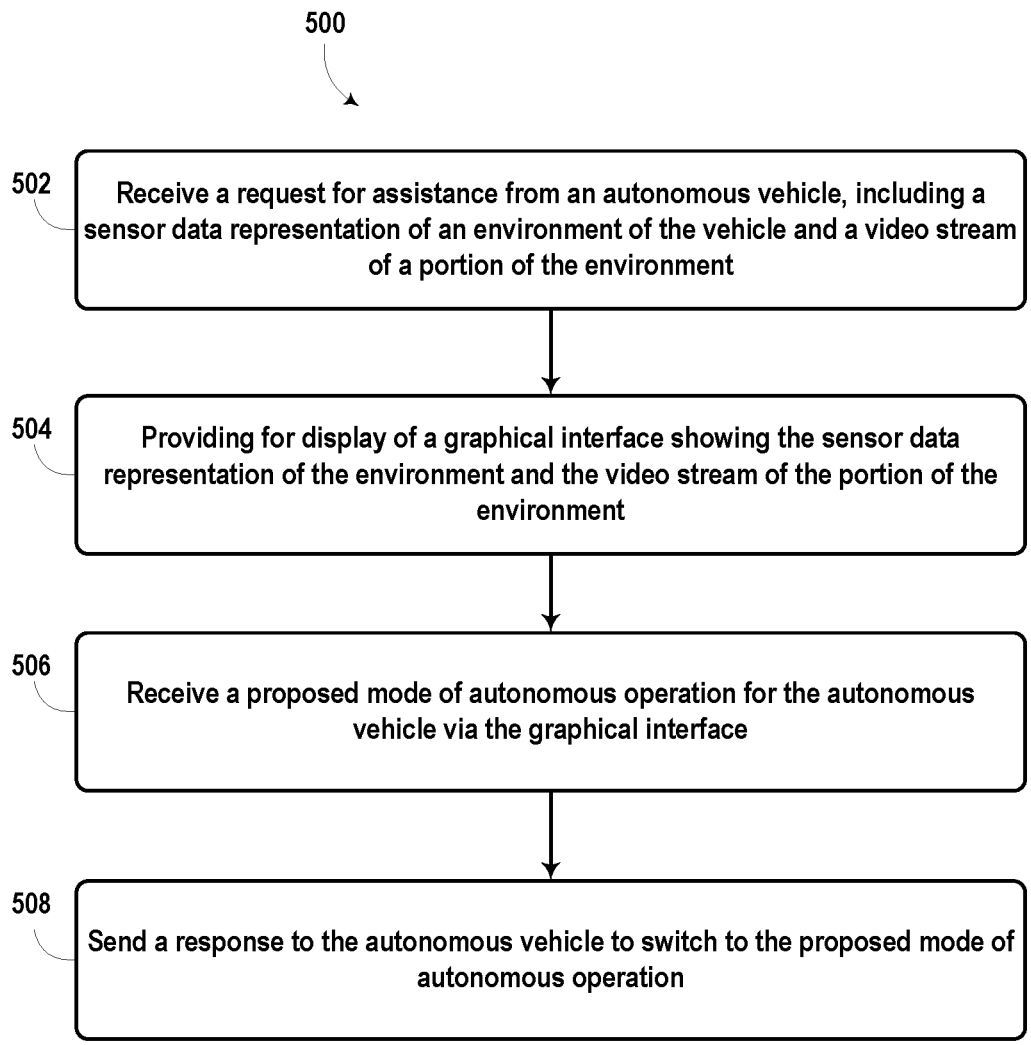
FIG. 5 illustrates a block diagram of another method, according to an example embodiment.

FIG. 5 is a block diagram of another method, according to an example embodiment. Method 500 as shown in FIG. 5 may be executed to respond to a request for assistance from an autonomous vehicle, such as a request sent by a vehicle as described above with respect to method 300. Method 500 may be executed by a remote computing system, such as a computing system with a display terminal that receives input from a remote human operator. Method 500 may be executed by a computing system of an autonomous vehicle as well, such as when the autonomous vehicle requests assistance from a passenger of the vehicle.

In addition, each block of the flowchart shown in FIG. 5 may represent circuitry that is wired to perform the specific logical functions in the process. Unless specifically indicated, functions in the flowchart shown in FIG. 5 may be executed out of order from that shown or discussed, including substantially concurrent execution of separately described functions, or even in reverse order in some examples, depending on the functionality involved, so long as the overall functionality of the described method is maintained.

Block 502 of method 500 includes receiving a request for assistance from an autonomous vehicle, including a sensor data representation of an environment and a video stream of a portion of an environment of the vehicle. The request may include any of the aspects of a request described above with respect to method 300. In particular, the request may include a sensor data representation of the environment of the autonomous vehicle based on any of the types of sensor data described above with respect to method 300, such as the sensor data representation shown in FIG. 4B. Additionally, the request may include one or more video streams of portions of the environment of the vehicle, such as shown in FIG. 4C. Other types of sensor data may also be received, including still images, radar or laser range finder data indicating distance to and/or location of nearby objects, or audio data captured by one or more microphones.

Block 506 of method 500 includes displaying a graphical interface showing the sensor data representation of the environment and the video stream of the portion of the environment. In particular, method 500 may involve the use of a remote human assistor, such as a human guide who accesses a graphical interface, such as the one depicted in FIGS. 4D and 4E. The human guide may be presented with the vehicle's own representation of its environment within a first sub-window of the graphical interface and a live video feed of a portion of the environment within a second sub-window of the graphical interface. In further examples, the human guide may also be presented with additional information regarding the current mode of operation of the vehicle when the requested for assistance was made. In some examples, the human guide may verify that the vehicle's representation of its environment and/or a proposed mode of operation of the vehicle is correct by comparing the sensor data representation (e.g., how the vehicle sees its environment) to the live video feed(s). In some examples, the vehicle's representation of its environment may also be overlayed on top of the video stream within the user interface. For instance, rather than showing the vehicle's representation in sub-window 414 and the video stream in sub-window 416 as separate windows within a user interface as shown in FIG. 4C, a user interface may contain a single viewing window with both the video stream and the vehicle's representation aligned. Overlaying the vehicle's representation may make it easier for an operator to understand how detected objects in the vehicle's representation may correspond to visual objects within the video stream.

Block 508 of method 500 includes receiving a proposed autonomous mode for the vehicle via the graphical interface. In particular, the human guide may input an autonomous mode of operation into the graphical interface (e.g., by selecting from a list of possible options or manually inputting a different mode of operation). In some examples, a human guide may be presented with a list of preset options that they can always send to the vehicle (e.g., "Stop immediately," "Pull over soon," etc.). In other examples, the vehicle may propose certain possible modes of operation for the human guide to consider. A combination of different methods of receiving input via the graphical interface may be used in some examples as well.

In further examples, method 500 may involve receiving help from a passenger of the autonomous vehicle in order to determine an autonomous mode of operation for the vehicle. The passenger may be asked for assistance through a graphical interface in the car, for example. The passenger may then respond by selecting an autonomous mode for the vehicle (e.g., by selecting an option on the graphical interface or by giving a vocal command to the graphical interface).

Block 508 of method 500 involves sending a response to the autonomous vehicle to switch to the requested autonomous mode of operation. The autonomous mode of operation may be any of the autonomous modes of operation described above with respect to method 300. For example, the autonomous mode may include one or more autonomous operations such as to turn, start, stop, pass on the left or right, change speed and/or direction, pull over, back up, or any number of other possible operations. The second autonomous mode may also indicate a range of speeds for the vehicle to operate in or otherwise provide guidance to the vehicle without specifying particular operations. In cases where method 500 is carried out by a remote computing system, the response may be sent wirelessly to a communication system of the autonomously vehicle. In other examples (such as when the autonomous operation is determined by interfacing with a passenger of the vehicle), the response may be sent through a direct hardware connection within the autonomous vehicle. The response may be transmitted to a control system of the autonomous vehicle indirectly through other systems and/or in other ways in some examples as well.

Figure 6:
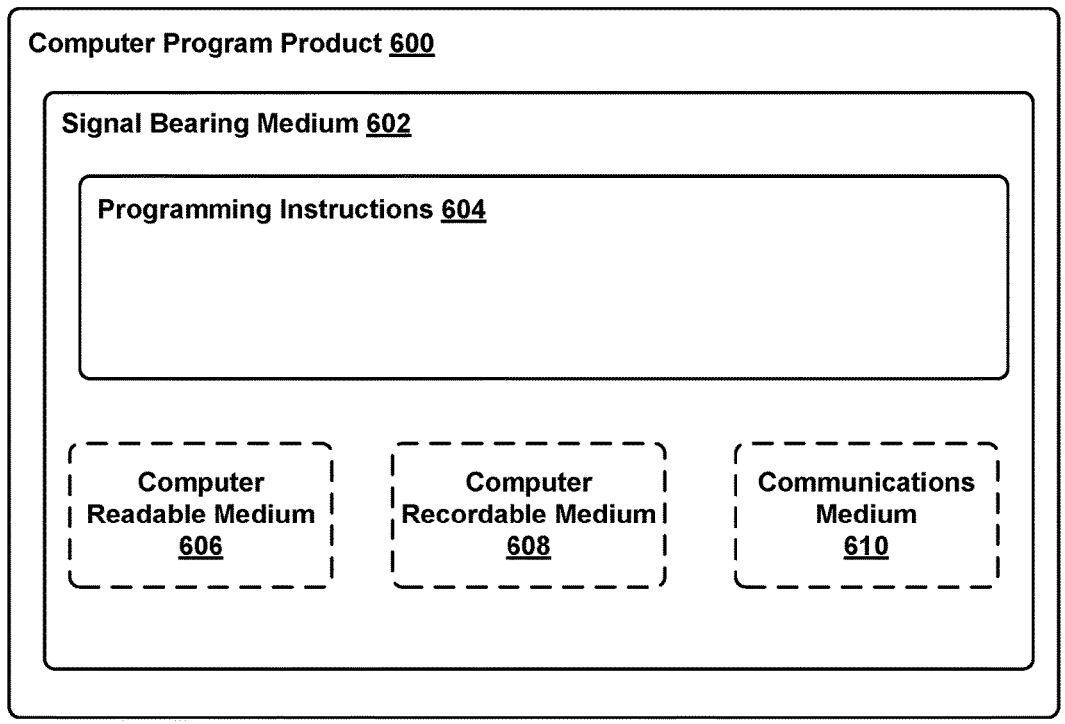
FIG. 6 is a schematic diagram of a computer program, according to an example embodiment.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 may encompass a non-transitory computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 112 of FIG. 1 may be configured to provide various operations, functions, or actions in response to the programming instructions 604 conveyed to the computer system 112 by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A computer-implemented method comprising:
receiving a request for assistance from an autonomous vehicle, the request comprising:
a sensor data representation of an environment of the autonomous vehicle, the sensor data representation comprising a representation based on sensor data collected by the autonomous vehicle while operating in autonomous mode; and
a live video stream of a portion of the environment from one or more cameras on the autonomous vehicle;
providing for display of a graphical interface, wherein the graphical interface comprises a first sub-window showing the sensor data representation of the environment and the graphical interface further comprises a second sub-window showing the live video stream of the portion of the environment, wherein the first sub-window and the second sub-window are simultaneously displayed within the graphical interface to allow for comparison of detected objects in the sensor data representation with corresponding objects in the live video stream;

receiving, via the graphical interface, input data indicating a suggested mode of autonomous operation for the autonomous vehicle; and sending a response to the autonomous vehicle, wherein the response includes the suggested mode of autonomous operation for the autonomous vehicle.

2. The method of claim 1, wherein the sensor data representation comprises a composite representation based on sensor data collected from a plurality of different types of sensors on the autonomous vehicle.

3. The method of claim 1, wherein the sensor data representation comprises abstracted geometric shapes corresponding to one or more objects in the environment of the autonomous vehicle.

4. The method of claim 3, wherein the abstracted geometric shapes comprise three-dimensional rectangular shapes.

5. The method of claim 1, wherein the first sub-window showing the sensor data representation of the environment is displayed horizontally adjacent to the second sub-window showing the live video stream of the portion of the environment within the graphical interface.

6. The method of claim 1, wherein the sensor data representation is overlayed on top of the live video stream within the graphical interface.

7. The method of claim 1, wherein the first sub-window and the second sub-window are separate windows of approximately a same size within the graphical interface.

8. The method of claim 1, further comprising:
receiving one or more timestamps indicative of when the sensor data was collected;
based on the one or more timestamps, determining a latency amount indicative of an age of the sensor data; and
providing for display of the latency amount within the graphical interface.

9. The method of claim 1, wherein the input data further comprises a focus region that indicates a particular portion of the environment for the autonomous vehicle to watch for a change within the environment in order to proceed within the suggested mode of autonomous operation, and wherein the response to the autonomous vehicle further comprises the focus region.

10. The method of claim 1, wherein the graphical interface is presented to a human operator that is remote from the autonomous vehicle.

11. A system comprising:
a display device; and
a control system configured to:
receive a request for assistance from an autonomous vehicle, the request comprising:
a sensor data representation of an environment of the autonomous vehicle, the sensor data representation comprising a representation based on sensor data collected by the autonomous vehicle while operating in autonomous mode; and
a live video stream of a portion of the environment from one or more cameras on the autonomous vehicle;
display a graphical interface on the display device, wherein the graphical interface comprises a first sub-window showing the sensor data representation of the environment and the graphical interface further comprises a second sub-window showing the live video stream of the portion of the environment, wherein the first sub-window and the second sub-window are simultaneously displayed within the graphical interface to allow for comparison of detected objects in the sensor data representation with corresponding objects in the live video stream;
receive, via the graphical interface, input data indicating a suggested mode of autonomous operation for the autonomous vehicle; and
send a response to the autonomous vehicle, wherein the response includes the suggested mode of autonomous operation for the autonomous vehicle.

12. The system of claim 11, wherein the sensor data representation comprises a composite representation based on sensor data collected from a plurality of different types of sensors on the autonomous vehicle.

13. The system of claim 11, wherein the sensor data representation comprises abstracted geometric shapes corresponding to one or more objects in the environment of the autonomous vehicle.

14. The system of claim 11, wherein the first sub-window and the second sub window are separate windows of approximately a same size within the graphical interface, and wherein the first sub-window showing the sensor data representation of the environment is displayed horizontally adjacent to the second sub-window showing the live video stream of the portion of the environment within the graphical interface.

15. The system of claim 11, wherein the input data further comprises a focus region that indicates a particular portion of the environment for the autonomous vehicle to watch for a change within the environment in order to proceed within the suggested mode of autonomous operation, and wherein the response to the autonomous vehicle further comprises the focus region.

16. The system of claim 11, wherein the graphical interface is presented to a human operator that is remote from the autonomous vehicle.

17. A non-transitory computer readable medium having stored therein instructions, that when executed by a computing system, cause the computing system to perform functions comprising:
receiving a request for assistance from an autonomous vehicle, the request comprising:
a sensor data representation of an environment of the autonomous vehicle, the sensor data representation comprising a representation based on sensor data collected by the autonomous vehicle while operating in autonomous mode; and
a live video stream of a portion of the environment from one or more cameras on the autonomous vehicle;
providing for display of a graphical interface, wherein the graphical interface comprises a first sub-window showing the sensor data representation of the environment and the graphical interface further comprises a second sub-window showing the live video stream of the portion of the environment, wherein the first sub-window and the second sub-window are simultaneously displayed within the graphical interface to allow for comparison of detected objects in the sensor data representation with corresponding objects in the live video stream;
receiving, via the graphical interface, input data indicating a suggested mode of autonomous operation for the autonomous vehicle; and
sending a response to the autonomous vehicle, wherein the response includes the suggested mode of autonomous operation for the autonomous vehicle.

18. The non-transitory computer readable medium of claim 17, wherein the sensor data representation comprises a composite representation based on sensor data collected from a plurality of different types of sensors on the autonomous vehicle.

19. The non-transitory computer readable medium of claim 17, wherein the sensor data representation comprises abstracted geometric shapes corresponding to one or more objects in the environment of the autonomous vehicle.

20. The non-transitory computer readable medium of claim 17, wherein the first sub-window and the second sub-window are separate windows of approximately a same size within the graphical interface, and wherein the first sub-window showing the sensor data representation of the environment is displayed horizontally adjacent to the second sub-window showing the live video stream of the portion of the environment within the graphical interface.

* * * * *